United States Patent [19]

Larsen

[11] 4,436,085
[45] Mar. 13, 1984

[54] SOLAR COLLECTOR ASSEMBLY AND FRAME
[75] Inventor: Raymond B. Larsen, Sausalito, Calif.
[73] Assignee: Acme Solar Works, Inc., Lodi, Calif.
[21] Appl. No.: 411,032
[22] Filed: Aug. 24, 1982
[51] Int. Cl.³ .............................................. F24J 3/02
[52] U.S. Cl. .................................. 126/450; 126/417; 126/432; 126/444
[58] Field of Search .............. 126/450, 444, 445, 432, 126/417, 426

[56] References Cited
U.S. PATENT DOCUMENTS

| | | | |
|---|---|---|---|
| 4,036,209 | 7/1977 | Press | 126/426 |
| 4,079,726 | 3/1978 | Voelker | 126/426 |
| 4,170,223 | 10/1979 | Weideman | 126/450 |
| 4,321,912 | 3/1982 | Larsen | 126/450 |
| 4,360,005 | 11/1982 | Sharpe | 126/426 |

Primary Examiner—Larry Jones
Attorney, Agent, or Firm—Flehr, Hohbach, Test, Albritton & Herbert

[57] ABSTRACT

The invention comprises a solar collector formed from frame members which support spaced films of radiation absorbing and reflecting capabilities, respectively. The frame further supports an outer pair of films disposed on opposite sides of the inner films. The frame includes inlets and outlets for flow of water between the inner films and flow of air between the outer films and inner films.

6 Claims, 9 Drawing Figures

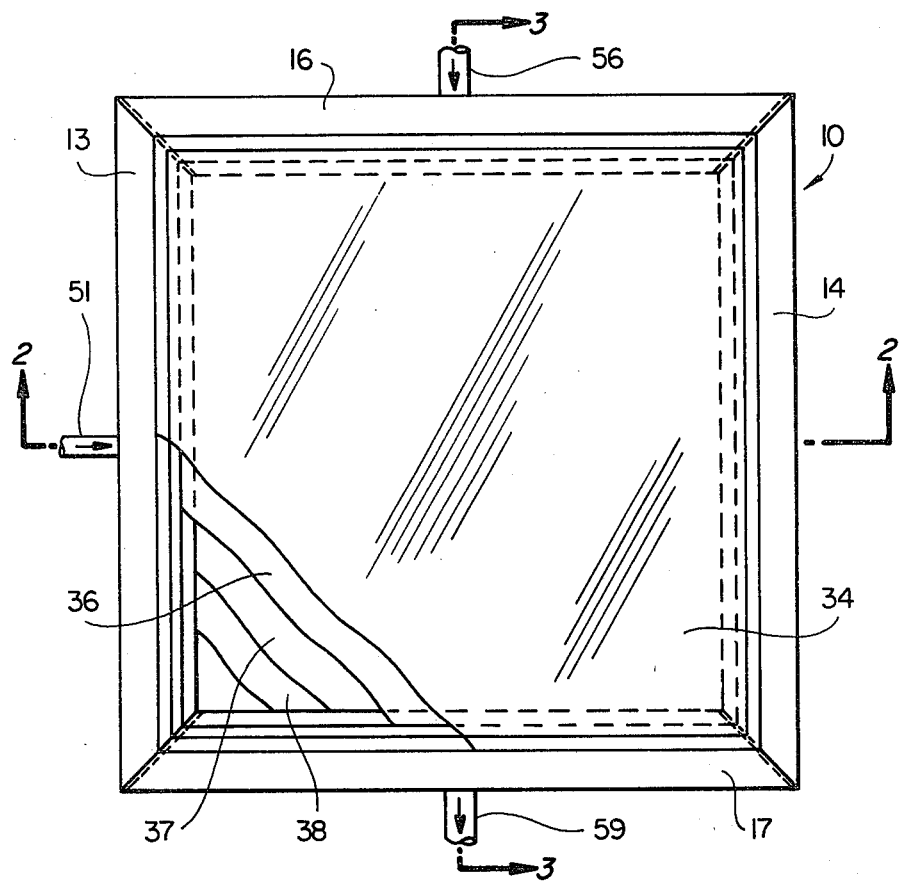
FIG_1
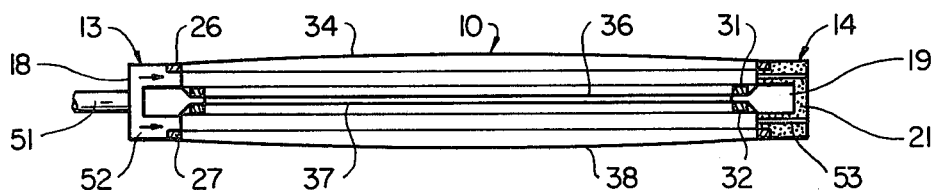
FIG_2
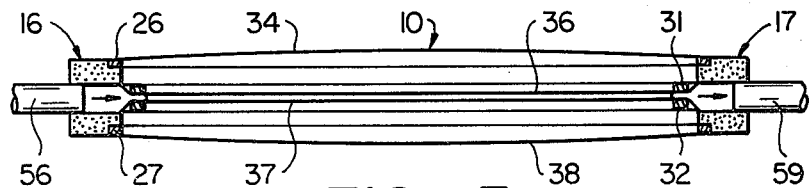
FIG_3

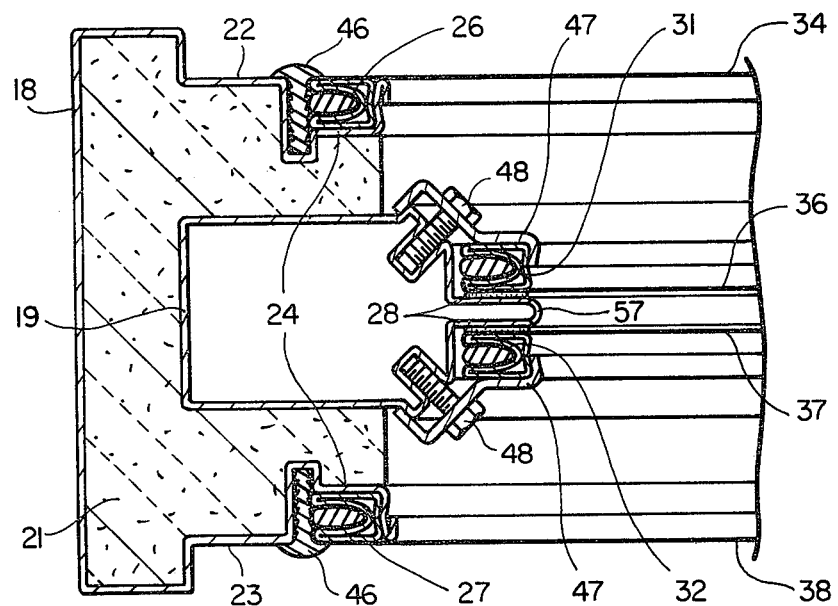
FIG_4
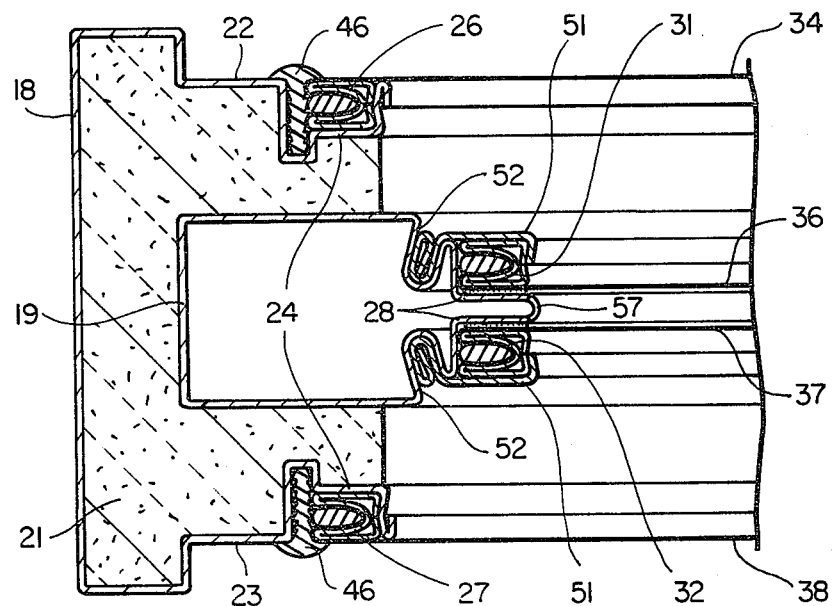
FIG_5

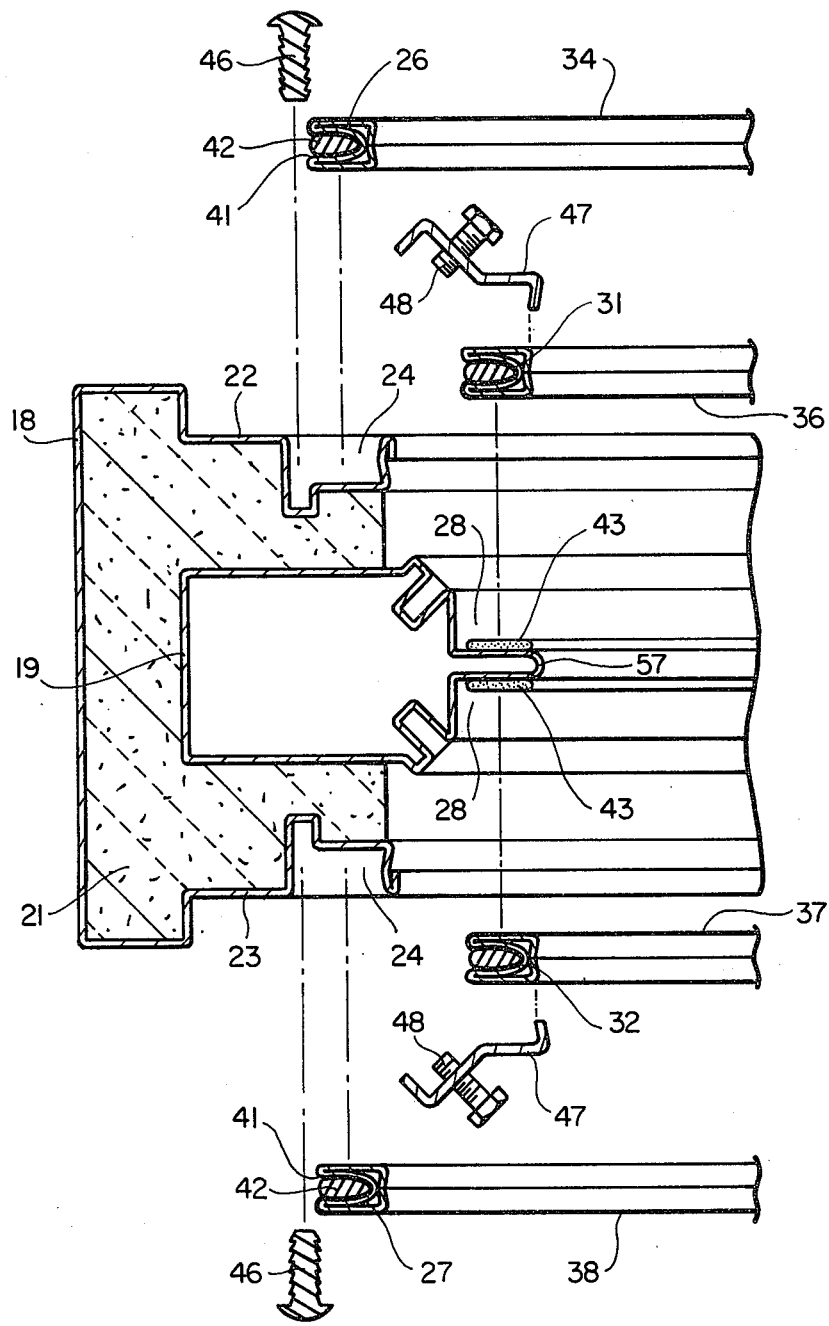
FIG_6

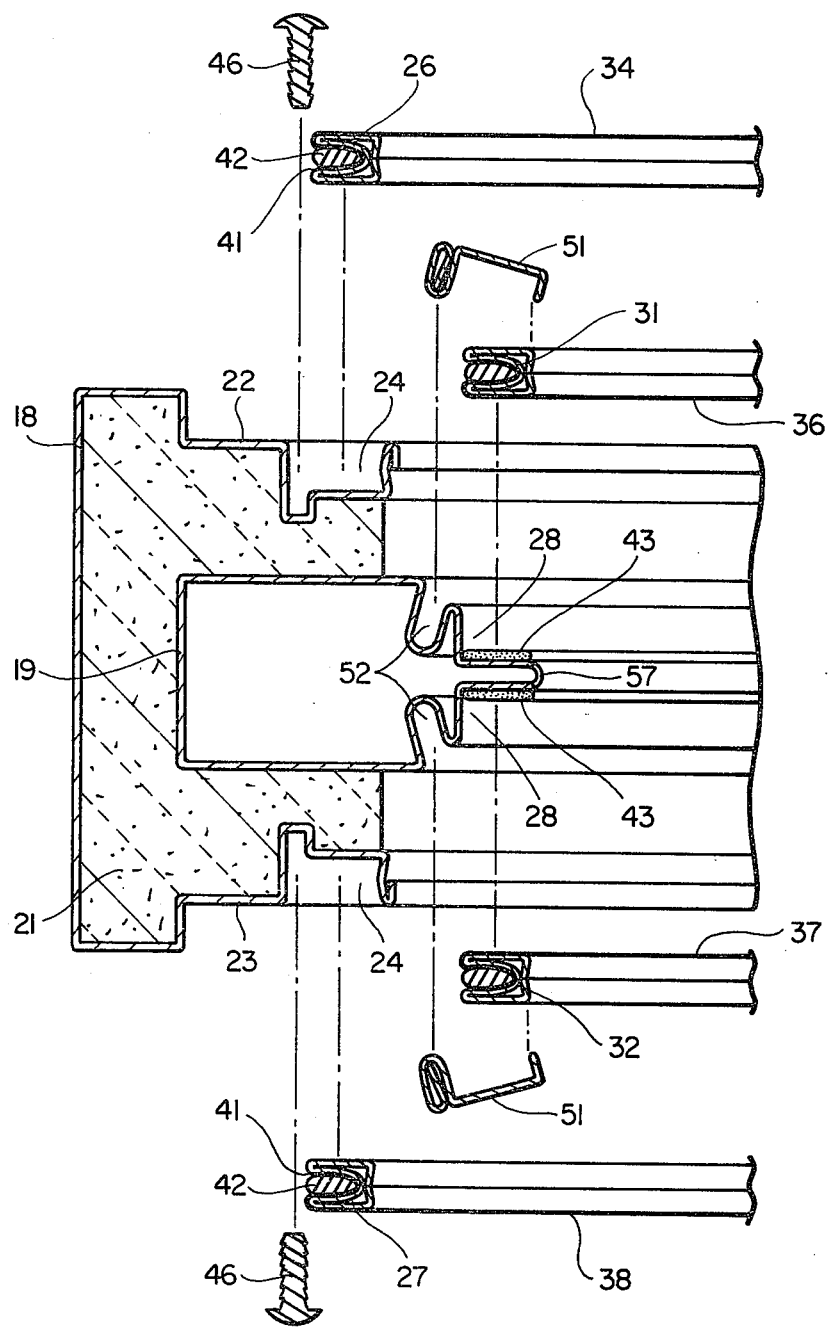
FIG_7

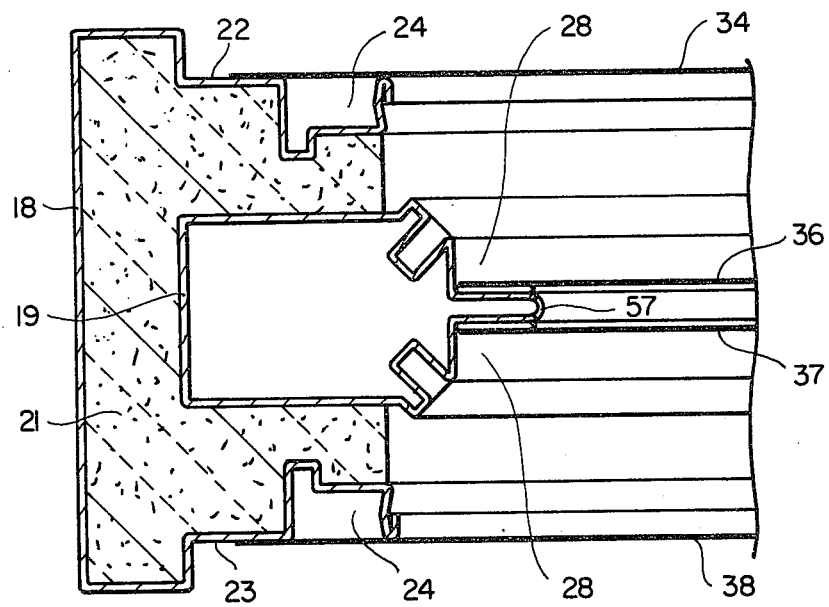
FIG_8
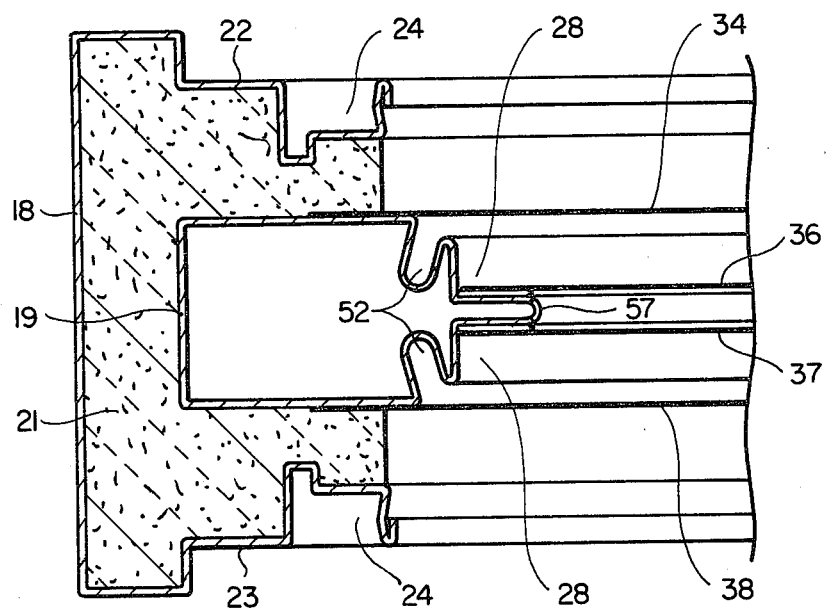
FIG_9

SOLAR COLLECTOR ASSEMBLY AND FRAME

This invention relates generally to a solar energy collector assembly and more particularly to a solar collector assembly in which film frames which support films are removably mounted in a collector frame to form a solar energy collector assembly.

In my co-pending application, Ser. No. 083,961, now abandoned, entitled Solar Energy Collector Assembly, there is described a solar collector assembly capable of directing an extremely thin film of water in direct contact with a flexible collector film mounted in a frame. The assembly includes a flexible first film mounted in the frame to cooperate with the collector sheet to form the thin film of water. A third and fourth film may be mounted in the frame to cooperate with the collector film and the first film, respectively to receive air and form air cushions. The tension of the films and the air pressure in the cushions maintains the thin sheet of water in intimate contact with the collector film. The frame assembly establishes both the desired spacing and tension on the films while permitting releasible but secure connection of the films in place in the frame. The frame also receives the water and directs it between the collector film and first film and provides a header for receiving the water after it passes along the collector film.

In my patent 4,321,912 there is described a frame assembly for a solar energy collector of the above type which includes a plurality of films in cooperative relationship with one another to form a thin fluid film. The frame ends and sides each include an elongated rigid outer channel having upwardly extending sides with a groove formed on the upper edge of each of the sides and a second elongated channel having grooves at the upper edge of each side adapted to fit within the first channel and means for supporting the first and second channels in spaced relationship with respect to one another. The upper edges of the two channels serve to receive the films and maintain them in suitable spaced relationship with one another.

In the above described solar energy collector assemblies the films are supported solely by the frame with their edges engaged by upwardly extending grooves which are spaced at different horizontal heights to provide the desired spacing. It has been found that it is difficult to replace individual films in the field in the event that they should deteriorate or be damaged. Furthermore, the original mounting and the replacement of such films requires skilled labor to assure that the edges are securely fastened and the films have the appropriate tension.

It is an object of the present invention to provide a solar energy collector in which the films can be rapidly and efficiently mounted and replaced in the field.

It is another object of the present invention to provide a solar collector assembly of the type described which includes an inexpensive frame assembly adapted to receive films which are premounted on film frames.

It is another object of the present invention to provide a solar energy collector assembly of the type including films which are premounted in film frames which can be readily mounted in a frame assembly.

If is a further object of the present invention to provide a frame assembly for supporting spaced films in which all films have an even inward tension on the frame to provide even inward forces on the frame to minimize twisting moment on the frame.

It is a further object of the present invention to provide a frame assembly which is inexpensive in construction and simple to assemble.

In accordance with the present invention there is provided a solar energy collector assembly including a frame assembly adapted to support a plurality of films to form a solar collector assembly capable of directing an extremely thin film of water in direct contact with a collector sheet with an adjacent film and air cushions serving to assure that a thin film of water flows in intimate contact with the collector film. The frame includes means for providing water contact with the collector sheet and for removing the water and means for applying air to the air cushions.

The above and other objects, advantages and features of the present invention will become more readily apparent when taken together with the following detailed description of the preferred embodiment in conjunction with the accompanying figures in which:

FIG. 1 is a top plan view of a solar collector assembly in accordance with the present invention;

FIG. 2 is a sectional view of the solar collector assembly of FIG. 1 taken generally along the line 2—2 of FIG. 1;

FIG. 3 is a cross-sectional view of a solar energy collector assembly of FIG. 1 taken generally along the line 3—3 of FIG. 1;

FIG. 4 is an enlarged assembled view of a portion of the film and frame of a solar collector assembly in accordance with one embodiment of the present invention;

FIG. 5 is an enlarged assembled view of the film and frame assembly in connection with another embodiment of the present invention;

FIG. 6 is an exploded view of the embodiment shown in FIG. 4;

FIG. 7 is an exploded view of the embodiment shown in FIG. 5; and

FIGS. 8 and 9 are enlarged views showing still other embodiments of the invention.

As illustrated in the Figures which show the preferred form of the collector assembly 10, the collector assembly is broadly comprised of an outer generally rectangular frame 11 having opposite side frame members 13 and 14 and opposite end frame members 16 and 17. Each frame member 13, 14, 16 and 17 has a C-shaped outer shell 18 and a boxlike inner member 19 suitably supported within the C-shaped shell 18 as by insulating material such as foamed in place insulating material 21. The outer shell includes arms 22 and 23 each having a groove 24 which traverses the entire peripheral extent of the frame 11 and serves to receive film frames 26 and 27, respectively. The boxlike member includes step 28 which traverses the entire peripheral extent of the frame and serves to receive film frames 31 and 32, respectively. The C-shaped sheet 18 and boxlike member 19 may be made by rolling or bending sheet metal or may be extruded plastic or other suitable inexpensive material.

In accordance with the present invention films to be presently described in more detail are supported in film frames which in turn are mounted to the main frame to maintain the films in suitable spaced relationship with one another to provide a solar collector assembly which operates in the manner described in copending application Ser. No. 083,961.

Turning now more particularly to the figures, the upper film frame 26 supports film 34, the next film frame supports film 36, the next film frame supports film 37 and the bottom film frame supports film 38.

The frames 26, 27, 31 and 32 are of identical configuration. They comprise a rectangular structure with the outer edge of the frame defining an inwardly re-entrant groove 41 adapted to receive the locking member 42 wich may be made of suitable resilient material such as rubber and which is retained therein by friction. The edges of the associated films 34, 36, 37 and 38 extend over the front outer edge of each of the frames 26, 31, 32 and 37, respectively, and into the groove where the edges are engaged by the member 42 and held securely in place under compression within the frames. Thus, the films 34, 36, 37 and 38 are independently supported under tension within their individual film frames 26, 27, 31 and 32.

The main frame serves to receive the film frames and as shown the groove 24 receives the frames 26 and 27 while the step 28 receives the frames 31 and 32. Suitable sealing means such as an elastomer 43 is provided at the base of the step 28 to provide a competent seal between the surface of the film frame and the adjacent step portion to guard against flow of water outwardly past the film frame.

The film frames may be retained in the main frame by various means. In the figures two such means are illustrated. In both embodiments the outer frames 26 and 27 are held within the grooves 24 by means of an elongated rubber locking insert 46 which engage the legs of the C-shaped outer member and retain the frame. The inner frames 31 and 32 in the embodiment of FIGS. 4 and 6 are retained by means of a clamp 47 which engages the inner periphery of the film frame and is secured to the boxlike member by means of screws 48. In the embodiment of FIGS. 5 and 7 the frames are retained by a clamp member 51 which has an end adapted to be releasably retained in a groove 52 formed adjacent the step 28.

When the solar panel is assembled there are provided a pair of closely spaced facing films 36 and 37 between which the fluid to be heated flows and outer films 37 and 38 which form respectively with the films 36 and 37 air cushions in which air may be forced to provide insulation and to force the films 36 and 37 toward one another. The tension of the films and air pressure in the cushions assures that the fluid flows in a thin uniform film.

Referring more particularly to FIGS. 2 and 3, air under pressure is supplied to the air cushions through an inlet tubing or hose 51 which is affixed to one edge of the frame assembly. A gap 52 in the insulation between the side members 18 and 19 provides a passage for air to flow inwardly between the layers 34, 36 and 37, 38 and outwardly through the openings 53 formed in the frame at the other side.

The liquid medium, preferably water, is supplied from an inlet header 56 formed along the top of the assembly by the boxlike members. A plurality of openings or ports in the extending nose 57 between the steps 28 directs the fluid between films 36 and 37. The fluid is collected through openings formed in the lower nose and by the plenum defined by the lower boxlike member and removed through the tubing 59 communicating with the boxlike member.

The upper film 34 is transparent and may comprise polyester, polyvynl chloride or the like. The solar energy collector film 36 has applied to its upper surface a deposited aluminum film of 1 ohm or less in measured thickness, or has laminated to its upper surface a thin sheet of aluminum film 0.0003 to 0.001 thousandths of an inch thick. For example, the film 36 may be comprised of polimide film 0.001 thousandths of an inch thick having a layer of aluminum applied to its upper surface and a layer of solar absorbing paint on the surface of the aluminum. The film 37 may be comprised of polimide film 0.001 thousandths of an inch thick with a layer of aluminum forming a highly reflective low emissivity surface. The bottom film 38 may comprise a polyester film with a layer of aluminum forming a highly reflective surface.

In certain instances it may be desirable to initially at the factory secure the films directly to the main frame and to use framed films for field replacement. An example would be to secure the films directly to the arms 22 and 23 and to the step 28 defining the nose 57. This is illustrated in FIG. 8. Alternatively, the films may be secured to the nose and to the sides of the boxlike member 19 as shown in FIG. 9. When replacing the films in the field films supported by film frames may be employed.

Thus, there has been provided a solar collector assembly which is inexpensive, highly efficient, easy to assemble and easy to repair.

What is claimed:

1. A frame for a solar collector comprising
    opposite side frame members and opposite end frame member connected to form a rectangular frame;
    each of said frame members comprising a C-shaped outer shell and a boxlike inner member supported in spaced relationship inside the C-shaped outer shell by insulating material;
    said boxlike member including a protrusion along the inner edge adapted to support films on each side therewith in spaced relationship to one another;
    said protrusion on the end members including openings to communicate with the space between said films;
    means for applying fluid to the boxlike member of the upper end member so that the fluid flows outwardly through the openings formed in its protrusion between the films and
    means for removing fluid which flows through the openings in the lower protrusion into the boxlike member of the lower frame member
    said frame adapted to support outer films one in spaced relationship with each adjacent inner film and
    means in one of said side frame members for introducing air between the outer films and the adjacent inner films and means in the other side frame member for allowing the air to vent.

2. A frame as in claim 1 in which said C-shaped members include a groove at the end of the arms of the member for receiving and holding an associated film frame.

3. A frame as in claim 1 in which said boxlike member defines with said protrusion a step for holding an associated film frame.

4. A solar energy collector comprising a frame having opposite side frame members and opposite end frame members connected to form a rectangular frame,
    each of said frame members comprising a C-shaped outer shell and a boxlike member supported in spaced relationship within the C-shaped shell by insulating material, a protrusion formed along the inner edge of said box-like member, means for supporting inner films on each side of said protrusion under tension and in spaced relationship to one another, said protrusions on said end members including openings adapted to communicate with the space between said films, means for applying water to the boxlike member and the upper end member so that the water flows outwardly though the openings formed in the protrusion, means for removing fluid that flows through the opening in the lower protrusion into the boxlike member of the lower end frame member, outer films secured to said side and end frame members in spaced relationship with the inner films, means in one of said side frame members for introducing air between the outer films and each of the adjacent inner films and means in the other side frame member for allowing air to leak or escape.

5. A solar energy collector as in claim 4 in which said C-shaped outer shell includes grooves formed in the arms thereof, film frames having mounted thereon the outer films and, means for engaging said film frame members in the grooves to secure the outer film via the frame to the collector frame.

6. A solar energy collector assembly as in claim 5 which includes film frames having mounted thereon said inner films and means are provided at said steps for securing said frames and films to the outer frames under tension.

* * * * *